US012122195B2

(12) United States Patent
Boisset et al.

(10) Patent No.: US 12,122,195 B2
(45) Date of Patent: Oct. 22, 2024

(54) METHOD FOR REMOTE CONTROL OF AN ACTIVATION OF A COMMAND IN A WHEEL UNIT

(71) Applicant: Continental Automotive GmbH, Hannover (DE)

(72) Inventors: Jean-Philippe Boisset, Toulouse (FR); Nicolas Guinart, Toulouse (FR); Davy Ribreau, Toulouse (FR)

(73) Assignee: Continental Automotive GmbH, Hannover (DE)

( * ) Notice: Subject to any disclaimer, the term of this patent is extended or adjusted under 35 U.S.C. 154(b) by 468 days.

(21) Appl. No.: 17/436,906

(22) PCT Filed: Mar. 19, 2020

(86) PCT No.: PCT/EP2020/057559
§ 371 (c)(1),
(2) Date: Sep. 7, 2021

(87) PCT Pub. No.: WO2020/188017
PCT Pub. Date: Sep. 24, 2020

(65) Prior Publication Data
US 2022/0134817 A1 May 5, 2022

(30) Foreign Application Priority Data
Mar. 20, 2019 (FR) ...................................... 1902843

(51) Int. Cl.
*B60C 23/04* (2006.01)
*B60C 19/00* (2006.01)
(Continued)

(52) U.S. Cl.
CPC ...... *B60C 23/0479* (2013.01); *B60C 23/0462* (2013.01); *G07C 5/008* (2013.01);
(Continued)

(58) Field of Classification Search
CPC .......... B60C 23/0479; B60C 2019/004; B60C 11/246; B60C 23/0462; G07C 5/008;
(Continued)

(56) References Cited

U.S. PATENT DOCUMENTS 5,463,374 A 10/1995 Mendez et al.
6,825,758 B1 11/2004 Laitsaari
(Continued)

FOREIGN PATENT DOCUMENTS

CN 101010225 A 8/2007
CN 101861602 A 10/2010
(Continued)

OTHER PUBLICATIONS

Chinese Office Action with Search Report for Chinese Application No. 202080022297.5, dated Nov. 4, 2022 with translation, 27 pages.
(Continued)

*Primary Examiner* — Tyler J Lee
*Assistant Examiner* — Kimia Kohankhaki
(74) *Attorney, Agent, or Firm* — Buchanan Ingersoll & Rooney PC

(57) ABSTRACT

A method for controlling, by a remote monitoring and/or control device, an activation of a command in a wheel unit that has previously stored a group of authorized UHF communication devices and checked whether a device that has sent a response message belongs to the group. If it does, the wheel unit sends a series of command-related signaling messages with each message associated with a single command. When the authorized device receives a message relating to a specific command that the authorized device requests to have activated by the wheel unit, the authorized device sends back to the wheel unit a standard response message interpreted as an activation order for the wheel unit to activate the specific command.

13 Claims, 4 Drawing Sheets

(51) Int. Cl.
  *G07C 5/00* (2006.01)
  *G08C 17/02* (2006.01)
  *H04B 1/00* (2006.01)
  *H04B 1/3822* (2015.01)
  *H04L 7/00* (2006.01)

(52) U.S. Cl.
  CPC ........... *G08C 17/02* (2013.01); *H04B 1/3822* (2013.01); *B60C 2019/004* (2013.01); *H04B 1/00* (2013.01); *H04L 7/00* (2013.01); *H04Q 2209/43* (2013.01)

(58) Field of Classification Search
  CPC ........ G08C 17/02; H04B 1/00; H04B 1/3822; H04Q 2209/43; H04L 7/00
  See application file for complete search history.

(56) References Cited

U.S. PATENT DOCUMENTS

| | | | |
|---|---|---|---|
| 9,895,942 B2 | 2/2018 | Vassilieff et al. | |
| 2003/0164758 A1 | 9/2003 | King et al. | |
| 2008/0272900 A1* | 11/2008 | Schillinger | B60C 23/0413 340/447 |
| 2009/0212905 A1 | 8/2009 | Batz et al. | |
| 2010/0191703 A1 | 7/2010 | Masson et al. | |
| 2013/0106596 A1* | 5/2013 | Mouchet | B60C 23/0472 340/445 |
| 2016/0325592 A1* | 11/2016 | Tomakidi | B60C 23/0471 |
| 2017/0190225 A1 | 7/2017 | Yu et al. | |
| 2017/0225526 A1 | 8/2017 | Tomakidi | |

FOREIGN PATENT DOCUMENTS

| | | |
|---|---|---|
| CN | 104093577 A | 10/2014 |
| CN | 108306940 A | 7/2018 |
| WO | 2013063061 A1 | 5/2013 |
| WO | 2015107203 A1 | 7/2015 |

OTHER PUBLICATIONS

International Search Report and Written Opinion for International Application No. PCT/EP2020/057559, mailed Apr. 28, 2020, with partial English translation, 8 pages.
International Search Report and Written Opinion for International Application No. PCT/EP2020/057559, mailed Apr. 28, 2020, 11 pages (French).
Chinese Office Action with Search Report for Chinese Application No. 202080022297.5 dated Jun. 28, 2023 with translation, 15 pages.
Chinese Notification to Grant Patent Right for Invention for Chinese Application No. 202080022297.5, issued Dec. 13, 2023 with English translation, 6 pages.

* cited by examiner

METHOD FOR REMOTE CONTROL OF AN ACTIVATION OF A COMMAND IN A WHEEL UNIT

CROSS REFERENCE TO RELATED APPLICATIONS

This application is the U.S. National Phase Application of PCT International Application No. PCT/EP2020/057559, filed Mar. 19, 2020, which claims priority to French Patent Application No. 1902843, filed Mar. 20, 2019, the contents of such applications being incorporated by reference herein.

FIELD OF THE INVENTION

The present invention relates to a method for controlling, by means of a remote monitoring and/or control device, an activation of a command in a wheel unit associated with a wheel of a motor vehicle.

BACKGROUND OF THE INVENTION

Nowadays, in a motor vehicle, it is known practice to mount an electronic measurement module comprising one or more sensors in each wheel in order in particular to detect an anomaly with the wheel. These sensors may, for example, be a tire inflation pressure sensor and/or a wheel acceleration sensor.

These sensors, and in particular inflation pressure sensors, are mounted in electronic modules, called "wheel units", of a tire pressure monitoring system, of the type known under the abbreviation "TPMS".

FIG. 1 shows a tire monitoring system 101 in a motor vehicle 105 equipped with wheel units 3a to 3d and with a central electronic unit 2a for controlling the wheel units 3a to 3d which is placed at a distance from the wheel units 3a to 3d and, additionally, a mobile telephone in the possession of an authorized user serving as a device 2 for monitoring and/or controlling the wheel units 3a to 3d.

As is known, the wheel units 3a to 3d generally comprise a microprocessor, a memory, a transceiver, a supply battery, a pressure sensor and, if applicable, at least one other sensor such as a radial acceleration sensor capable of measuring the radial accelerations of the wheel or a temperature sensor, mounted on a support forming a printed circuit board or "PCB".

According to the prior art, each wheel unit 3a to 3d associated with a wheel 102a to 102d of the motor vehicle 105 sends its measurements to a central electronic unit 2a for controlling the wheel units 3a to 3d that is integrated in the motor vehicle 105 and/or a mobile telephone 2 or technical equivalent provided with an application for communicating with the wheel units 3a to 3d, the central electronic unit 2a and the mobile telephone 2 being grouped together below under the name of device for remotely monitoring and/or controlling the wheel units 3a to 3d.

To this end, each wheel unit 3a to 3d transmits signals 106 to one or more devices 2, 2a for remotely monitoring and/or controlling the wheel units 3a to 3d comprising coded messages containing the measurements or other information processed and/or supplied by the wheel units 3a to 3d.

As other information, mention may be made of information relating to the geometry of the wheel, in particular of the rim and/or of the tire or to the history of the wheel, in particular its mileage, of specific application data, in particular an identification of the wheel units 3a to 3d, a location of the wheel on the vehicle 105 and other configurations of the system.

Finally, the processed and/or supplied information may relate to configuration parameters of the software application, or even the executable code in the case of remote reprogramming of the wheel units 3a to 3d.

Communication between the monitoring device 2, 2a and the wheel unit 3a to 3d, whether it is a mobile telephone or technical equivalent in the possession of an authorized user or the central electronic unit 2a for controlling the wheel units 3a to 3d that is integrated into the motor vehicle 105, is carried out according to a communication protocol allowing a bidirectional short-range data exchange using ultra-high-frequency, or UHF, radio waves according to a communication protocol of Bluetooth® type.

To do this, the wheel unit 3a to 3d periodically sends basic signaling messages indicating its presence to any ultra-high-frequency wave communication device 2 located in an environment of the wheel unit 3a to 3d.

Such a communication device 2 is capable of intercepting a basic signaling message and of sending a standard response message to the wheel unit 3a to 3d, in particular, but not necessarily, when it is authorized to do so.

Indeed, a UHF communication device that is not associated with the wheel unit 3a to 3d and therefore not authorized to correspond with the wheel unit 3a to 3d may also intercept the basic signaling message and respond thereto, which means implementing a check of the authorization of any communication device 2 that has responded.

The bidirectional data exchange mode nominally provided by the Bluetooth communication protocol or equivalent protocol involves establishing a connection between the two communicating devices.

Such communication poses a problem due to a high level of energy consumption of the bidirectional exchanges between the wheel unit and an authorized device in connected mode with possible interruptions of the connection during vehicle driving phases.

The major drawback is therefore the very high level of energy consumption required by the connected mode between the wheel units and the remote authorized device and degraded communication quality when the vehicle is in motion.

The authorized remote monitoring and/or control device may need to have a specific command performed by the one or more wheel units. Without this being limiting, these commands activated by the device in a wheel unit may relate to the execution of particular functions, such as, for example, detection of aquaplaning, execution of particular diagnostics, particular sequences of transmissions with, in particular, modification of a periodicity of sending of messages by the wheel unit and executions of a determined functional scenario.

For example, it is common to check and, if necessary, update the location of the wheel units with respect to a wheel position in the vehicle. This check is generally performed at the start of a new driving cycle and requires, according to the current prior art, periodic transmissions of messages synchronized with a determined angular position of the transmitting wheel unit.

This synchronization requires specific processing by the wheel unit and significantly increases its level of energy consumption. In this case, the monitoring and/or control device activates and then deactivates the execution of this specific processing.

The problem underlying the present invention is that of optimizing communications between at least one wheel unit associated with a wheel of a motor vehicle and a monitoring and/or control device located at a distance from said at least one wheel unit, so that a command in the wheel unit may be selected and activated by the monitoring and/or control device in disconnected mode.

SUMMARY OF THE INVENTION

To that end, an aspect of the present invention relates to a method for controlling, by means of a remote monitoring and/or control device, an activation of a command in a wheel unit associated with a wheel of a motor vehicle, the wheel unit having stored a list of commands to be activated on request and said monitoring device having stored the same list, a communication between said monitoring device and the wheel unit taking place according to a communication protocol that allows a bidirectional short-range data exchange using ultra-high-frequency radio waves according to a communication protocol of Bluetooth® type for example, the wheel unit periodically sending basic signaling messages indicating its presence to any ultra-high-frequency wave communication device located in an environment of the wheel unit, the communication device being capable of intercepting a basic signaling message and of sending a standard response message to the wheel unit, noteworthy in that, the wheel unit having previously stored a group of communication devices that are authorized to serve as remote monitoring and/or control devices therefore, the wheel unit checks whether the communication device that has sent a response message belongs to the group, and, if it does, the wheel unit sends the authorized device a series of command-related signaling messages, each signaling message of the series being associated with a single command and the series performing the enumeration of all of the commands of the list taken with one command per message for all of the signaling messages of the series, and, when the authorized device receives a message relating to a specific command that the authorized device requests to have activated by the wheel unit, the authorized device sends back to the wheel unit a standard response message interpreted by the wheel unit as an activation order for the specific command.

Strictly speaking, in a Bluetooth® protocol or equivalent, in response to a basic signaling message from the wheel unit, the control device cannot send data signifying a request to enumerate the list of stored commands or to activate a specific command. It can send only the equivalent of an acknowledgement of receipt of the basic signaling message sent by the wheel unit, without data included, which is called a standard response message.

It is this acknowledgement of receipt that acts as a command enumeration request or later as a request to activate a specific command when the wheel unit receives it, the wheel unit being programmed so that a standard response message sent by the device and received by the wheel unit signifies a request to enumerate the command list or a request to activate a specific command, depending on the signaling message that the wheel unit had previously sent.

Likewise, at the end of the method, the standard response message that the authorized device sends back to the wheel unit, which is a simple acknowledgement of receipt and therefore without specific data, is interpreted by the wheel unit and programmed accordingly as an order for the wheel unit to activate one of the commands, following the signaling message that the wheel unit had previously sent.

Therefore, the sending by the authorized device of a standard response message forming only an acknowledgement of receipt in response to a signaling message sent by the wheel unit allows the wheel unit to know what action to take, for example enumerate a list of commands at the start of the method or activate a specific command at the end of the method.

This is determined according to the signaling message that the wheel unit sent and the stage of the method. It is therefore done without the authorized device needing to inform, in its response message, what action is to be taken by the wheel unit.

An authorized device is an ultra-high-frequency, or UHF, communication device that has been recognized by the wheel unit as authorized to communicate with the wheel unit.

What is meant by short range is over distances that may range from 0 to 100 meters. The present invention is not limited to the Bluetooth® communication protocol, and may use any communication protocol that employs ultra-high-frequency waves.

Electromagnetic fields are classified according to their frequencies. When microwaves or UHF radio waves, UHF meaning ultra-high frequency, are spoken of, what it is a question of are frequencies from 300 MHz to 300 GHz, most microwave sources emitting in the range of 900 to 2,600 MHz, or higher.

The presence of an aspect of the invention provides a simple solution that makes it possible to solve the problems of consumption and availability of bidirectional communication while maintaining the ability to control and trigger the functions in the wheel unit.

Instead of sending all of the data relating to a command to be performed by the wheel unit, the command is identified by its number by exchanging signaling messages relating, respectively, to a command between the wheel unit and the authorized device, which is simpler and saves energy in the wheel unit.

The problems solved here are those of managing the service life of the wheel unit, the ability to maintain bidirectional exchanges despite a communication environment, and the possibility of remotely controlling and triggering specific and contextual processes of the wheel unit.

If one signaling message relating to a command number is not received, another signaling message relating to the same command number will be received later whereas a long frame of data relating to the command would be lost and its transmission would have to be started over from scratch.

To limit energy consumption, the UHF communication module of a wheel unit may by default offer limited connection means in disconnected mode by sending signaling messages that have a long periodicity between them, which does not allow the quality of service expected by a user, that is to say the person in possession of the UHF communication device communicating with the wheel unit, when this user is close to the vehicle and when the desired goal is not detection of the approach of the user but establishment of communication between the wheel unit and the UHF communication device of the user.

Advantageously, by implementing the method according to an aspect of the present invention, an authorized UHF communication device may remotely activate a specific command triggered by the wheel unit when this request is detected by decreasing the sending period for signaling messages.

The method may also be applicable for controlling changes of state of the wheel unit, a change in the configurations specific to the communication, execution of a specific function or of a sequence of operations programmed in advance.

For example, when the wheel unit receives response messages from a UHF communication device that it identifies as authorized, the wheel unit may advantageously switch to a more intense communication mode, in order to facilitate a potential direct connection with the authorized device.

For example, transmissions of signaling message type from a wheel unit, which typically take place every 20 seconds for the sake of optimizing service life, may switch, on receiving a response message from an authorized device, to a period of 4 seconds. Communication between the wheel unit and the authorized device is temporarily accelerated thereby.

As another example, still on detecting a recognized authorized UHF communication device, the fundamental activities of the wheel unit may be activated and/or accelerated in order to offer updated information expeditiously: pressure and/or temperature of the tire of the wheel, acceleration of the wheel, alerts, one-off event, etc.

For the sake of saving energy, it is the authorized device that selects the commands to be activated. A plurality of commands may be activated simultaneously.

Advantageously:
a signaling message of the series relating to a specific command is repeated for a predetermined duration for as long as no response from the authorized device is received by the wheel unit, the sending of the messages specific to this command being suspended at the end of the predetermined duration and a signaling message of the series relating to another command is sent and is repeated, if necessary, this being performed successively for all of the commands of the list, or
a signaling message specific to a single command is sent followed by a specific signaling message for each of the other commands of the series.

This saves energy and covers the cases in which communication may have been lacking with an authorized communication device that could not intercept the signaling messages sent by the wheel unit.

Advantageously, when the authorized device sends back to the wheel unit a standard response message received by the wheel unit and interpreted as an activation order for a command, the sending of signaling messages for the other commands is suspended and, when the signaling messages have been sent to the authorized device without response therefrom for the entire series of commands, the wheel unit sends a signaling message to the authorized device and if the authorized device responds and confirms by sending a standard response message interpreted by the wheel unit as a request to enumerate the commands contained in the list, a new series of signaling messages relating to the commands is sent by the wheel unit to the authorized device. This allows the process of selecting a command to be started again when communication has been lacking.

Advantageously, a number is assigned to each command in the list of commands and in each authorized device, the signaling messages of the series each taking the respective number of the associated command with an identifier linked to the wheel unit or an identifier linked to the authorized device.

Advantageously, the wheel unit and the authorized device respectively comprising a basic identifier used for communication other than command-related signaling messages, a first of the basic identifiers of the wheel unit or of the authorized device is temporarily modified for the command-related signaling messages, the second of the basic identifiers of the wheel unit or of the authorized device remaining unchanged, the wheel unit or the authorized device with the unchanged second identifier taking into account from a start of sending of the command-related signaling messages that the first identifier has been temporarily modified.

In these two alternative embodiments, either the wheel unit changes identifier or the authorized device changes identifier, the first case being preferred.

Advantageously:
when the first modified identifier is that of the wheel unit, the basic identifier of the wheel unit is temporarily duplicated into as many modified identifiers as there are commands in the list, each temporarily modified identifier of the wheel unit comprising a number of a respective command of the list, the basic identifier of the authorized device being retained, the authorized device responding to the signaling message from the wheel unit under the modified identifier comprising the number of the command that the authorized device requests to have activated, or
when the first modified identifier is that of the authorized device, the basic identifier of the authorized device is temporarily modified to include the number of the command that the authorized device requests to have activated, the basic identifier of the wheel unit being retained, the wheel unit sending signaling messages relating to the commands for authorized devices identified, respectively, by the basic identifier of the authorized device including a respective command number, the authorized device with the modified identifier temporarily including the number of the command that the authorized device requests to have activated being the only one of said authorized devices to be able to respond to the signaling message containing the command number to be activated, the other authorized devices with modified identifiers being virtual.

For reasons of operational safety and robustness, where applicable, if an "unauthorized" device, or even another authorized device, acknowledges, in a response message, receipt of one of the enumerations of commands by the wheel unit, the latter does not take account thereof.

Stated otherwise, since the command proposals are marked with the identifier of the authorized device selected at the start of the sequence, only the responses from said authorized device are considered by the wheel unit.

Advantageously, when the bidirectional short-range data exchange using ultra-high-frequency radio waves is performed with a number of respective frequency channels at least equal to the number of commands to be activated, each signaling message sent by the wheel unit and relating to a respective command passes through a specific channel, a channel number being assigned to each channel corresponding to the number of the command associated with the signaling message passing through this channel, the numbering of the channels according to the commands being known to the authorized device, the authorized device responding only to the signal message that has passed through the channel bearing the same number as the command that the authorized device requests to have activated by the wheel unit.

Advantageously, in addition to checking that a communication device belongs to the group of receiving devices that are authorized to serve as remote monitoring and/or control devices for the wheel unit in the capacity of authorized devices, one or more of the following checks are carried out, taken individually or in combination:

sending, by the wheel unit exclusively to an authorized device, of a check signaling message using an identifier previously assigned to the communication device modified by adding a confirmation key known to the wheel unit and to any authorized device, an authorized device being programmed to temporarily modify its identifier by adding the confirmation key thereto, and, when the communication device receives the check signaling message with the confirmation key and responds with a standard response message, it is confirmed that the communication device is indeed an authorized device wishing to trigger the enumeration of the commands, sending, by the wheel unit exclusively to an authorized device, of three successive signaling messages using an identifier previously assigned to the communication device, the first message requesting a response, the second message containing a response interdiction and the third message requesting a response and, when the communication device responds with a standard response message to the first and third messages without responding to the second, it is confirmed that the communication device is indeed an authorized device wishing to trigger the enumeration of the commands, sending, by the wheel unit exclusively to an authorized device, of at least two signaling messages using an identifier previously assigned to the communication device, the first signaling message being transmitted via a first, default frequency channel and said at least second signaling message being transmitted via a second channel, the frequency of which is different from the frequency of the first channel, an authorized device being programmed to perform, on receiving the first signaling message, a permutation of reception from the first channel to the second channel, and, when the communication device that has performed such a permutation and responded to said at least two signaling messages with a standard response message, it is confirmed that the communication device is indeed an authorized device wishing to trigger the enumeration of the commands.

Advantageously, the commands are selected from among a command relating to a period of sending of signaling messages by the wheel unit that becomes shorter when an authorized device is detected in proximity to the wheel unit and vice versa when the authorized device moves away from the motor vehicle, an estimate of a footprint of the wheel associated with the wheel unit, a detection of a particular phenomenon such as aquaplaning, an execution of a particular sequence of transmissions or an adjustment of a basic sequence of transmissions such as measurements of one or more specific parameters of the wheel that is associated with the wheel unit such as a pressure of the tire of the associated wheel, a speed of rotation of the wheel or a location of the wheel unit on the motor vehicle.

Advantageously, it is performed on each of the wheel units that are associated with a wheel of one and the same motor vehicle.

Advantageously, there is selected, at least temporarily, one wheel unit from among the wheel units to be a concentrator wheel unit carrying out communication between the wheel units and at least one remote monitoring and/or control device for the activation of at least one command in at least one of the wheel units, the concentrator wheel unit sending at least one signaling frame to at least one of the other wheel units when activation of a command is requested in said at least one of the other wheel units with mention of the requested command to be activated.

In the context of this preferred embodiment, a concentrator wheel unit may act as an authorized device or as a central electronic control unit on board the motor vehicle in communication with the other wheel units.

An aspect of the present invention also relates to a wheel unit comprising an application-specific integrated circuit with a microprocessor for controlling the unit, the integrated circuit being provided with a microprocessor and storage means, the wheel unit also comprising a module for ultra-high-frequency communication according to a bidirectional communication protocol, for example of Bluetooth® type, noteworthy in that the integrated circuit implements a method as described above.

An aspect of the present invention also relates to a communication device or a central monitoring and/or control device unit on board the motor vehicle comprising a chip able to implement the method as discussed above.

BRIEF DESCRIPTION OF THE DRAWINGS

Other features, aims and advantages of an aspect of the present invention will become apparent from reading the detailed description that follows and from examining the appended drawings given by way of non-limiting examples, and in which.

DETAILED DESCRIPTION OF THE INVENTION

Figure 1:
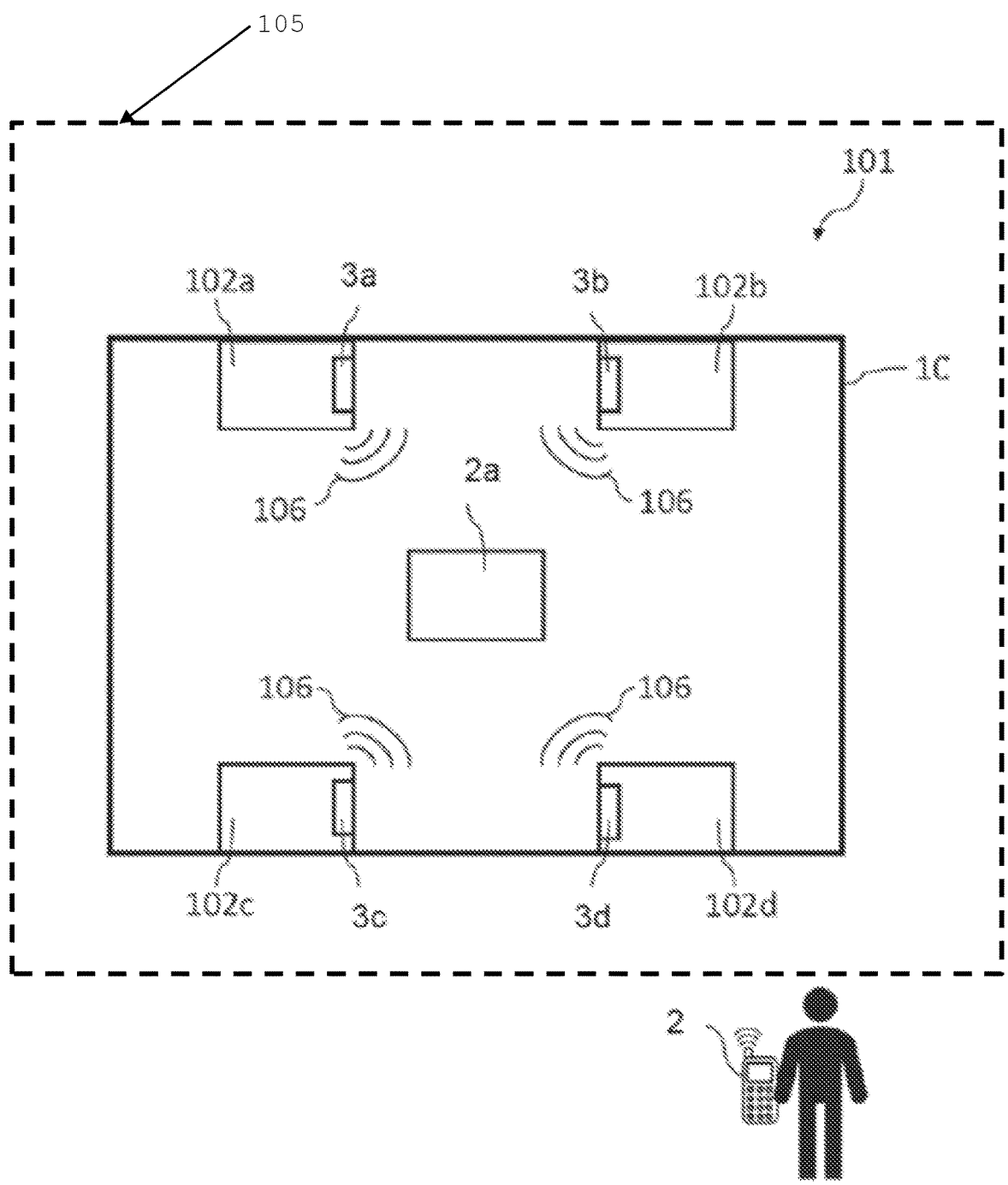
FIG. 1 schematically shows a view of a tire monitoring system in a motor vehicle, the system comprising wheel units each associated with a wheel of the vehicle and a central monitoring and/or control unit integrated into the motor vehicle, the system being able to communicate remotely with an electronic device such as a mobile telephone via ultra-high-frequency, or UHF, waves, such a system being known from the prior art but being able to implement the control method according to an aspect of the present invention, FIG. 2 schematically shows a first embodiment according to the present invention of the method for controlling, by means of a remote monitoring and/or control device, a command to be activated in a wheel unit associated with a wheel of a motor vehicle, the monitoring and/or control device changing name so as to receive signaling messages, each being specific to a proposed command for activation, these signaling messages being sent by the wheel unit in order to designate a command to be activated in the wheel unit, FIG. 3 schematically shows a second embodiment according to the present invention of the method for controlling, by means of a remote monitoring and/or control device, a command to be activated in a wheel unit associated with a wheel of a motor vehicle, the wheel unit changing name so as to send signaling messages, each being specific to a proposed command for activation, these signaling messages being sent to the wheel monitoring and/or control device in order to have it designate a command to be activated in the wheel unit from among the commands sent, FIG. 4 schematically shows an optional mode of auxiliary checking of authorization of a communication device to converse with the wheel unit in a method according to an aspect of the invention, the checking consisting in sending, by the wheel unit exclusively to an authorized device, of three successive signaling messages using an identifier of the communication device by alternating response requests for the first and third messages with a response interdiction for the second signaling message.

FIG. 1 has already been described in the introductory part of the present patent application.

Figure 2:
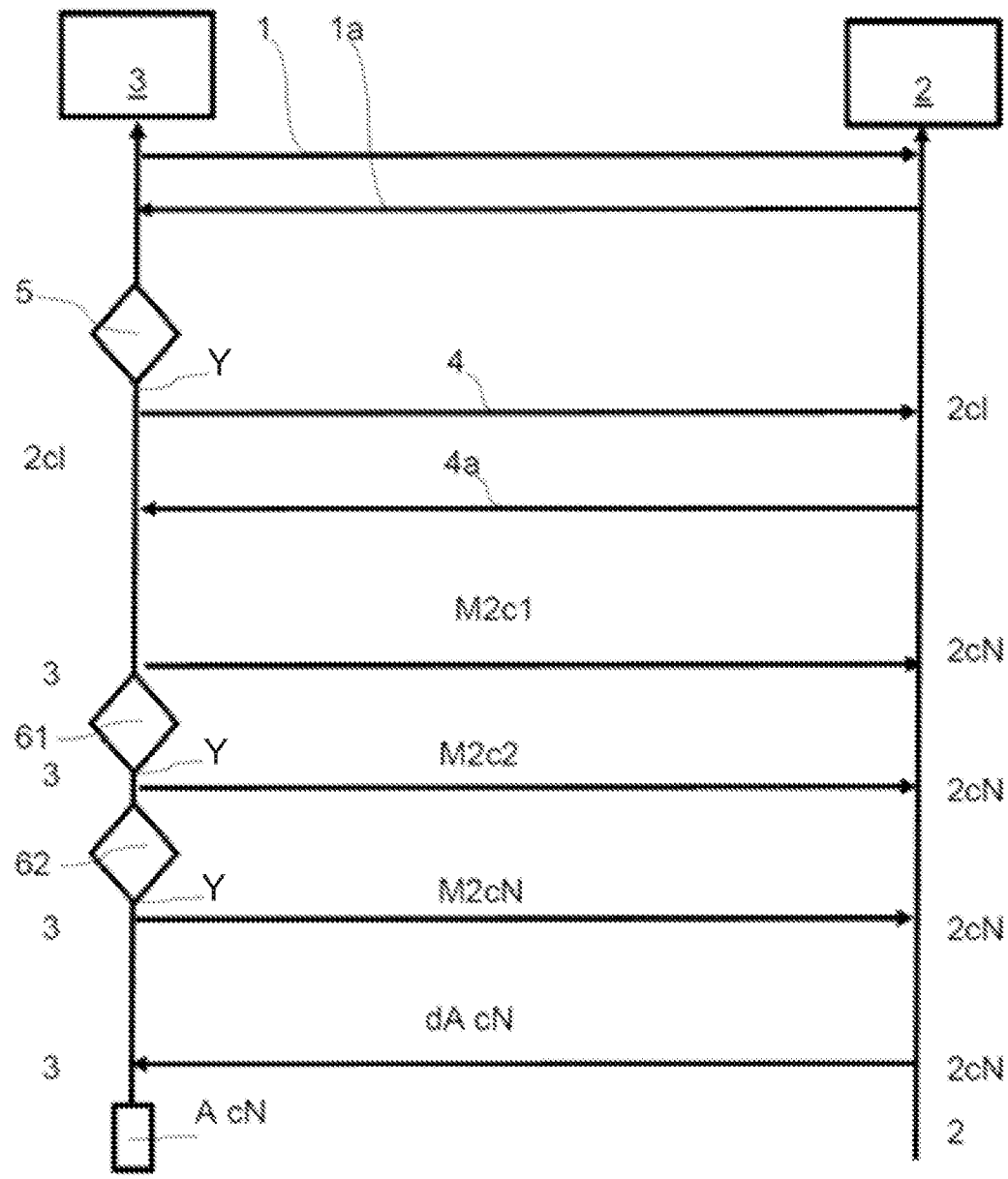
Figure 3:
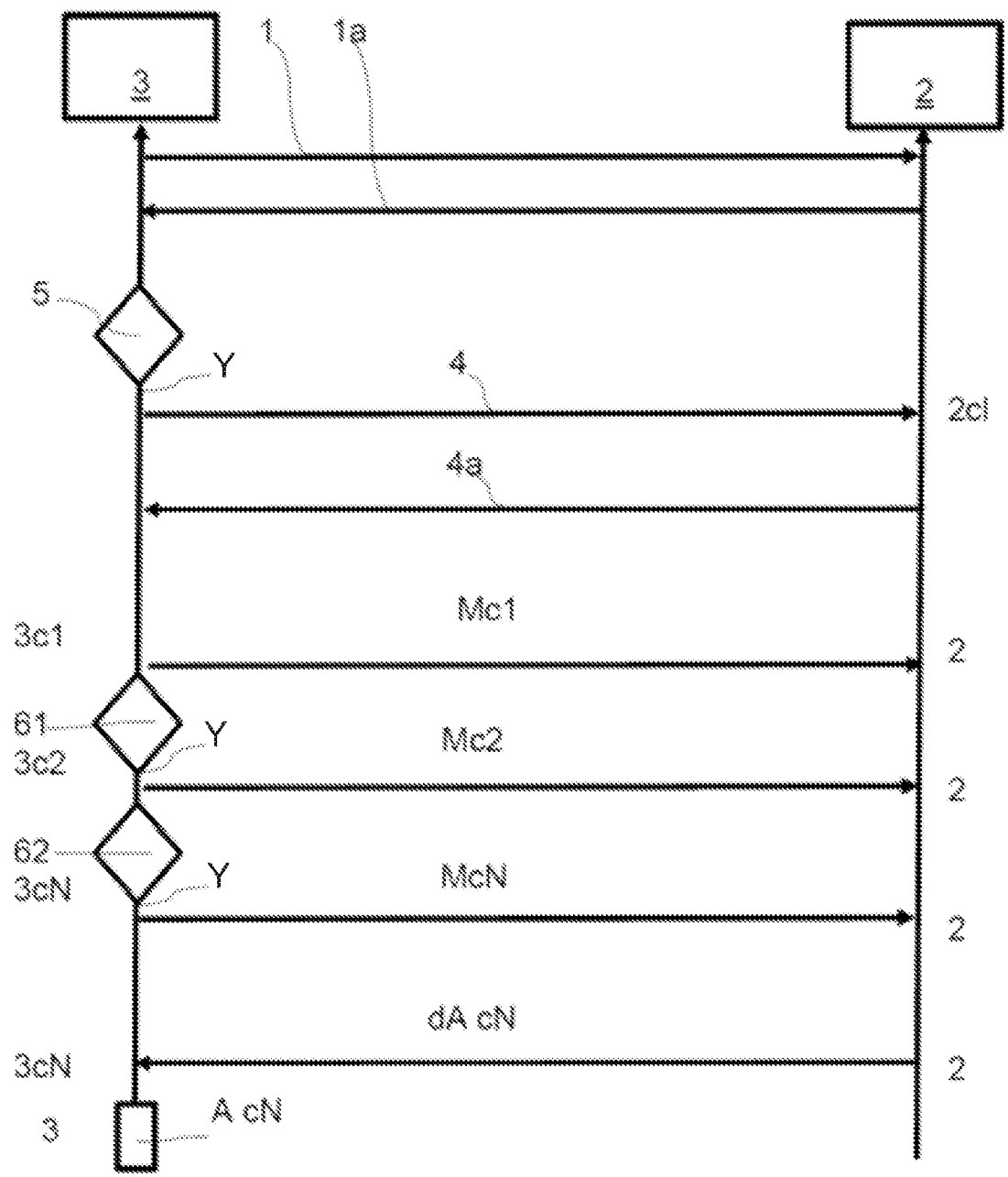

With reference to FIGS. 2 and 3, an aspect of the present invention relates to a method for controlling, by means of a remote monitoring and/or control device 2, an activation of a command in a wheel unit 3 associated with a wheel of a motor vehicle. The implementation of this method takes place in disconnected mode with respect to the wheel unit 3. What is stated for one wheel unit 3 is valid for all of the wheel units of a motor vehicle which were previously denoted 3a to 3d in FIG. 1.

What is meant by connected mode is a mode of communication that involves recurring protocol data exchanges in order to ensure the continuity of the communication link. This allows a large amount of information to be exchanged.

What is meant by disconnected mode is a mode of communication that involves brief exchanges without protocol data and does not require the communication link to be permanently maintained. However, the amount of information exchanged is limited.

In general, a device for monitoring and/or controlling the wheel units that is remote or on board the motor vehicle cannot send data to the wheel unit. However, the wheel unit can do it in the opposite direction.

In FIGS. 2 and 3, a wheel unit is denoted 3, to represent any wheel unit 3a to 3d of FIG. 1, and the remote monitoring and/or control device is denoted 2. These references will also be taken as respective identifiers of the wheel unit 3 and of the device 2, which is not the case in reality, an identifier being more complicated than just one number.

The remote monitoring and/or control device 2 may be a mobile telephone, a tablet computer or an equivalent electronic element that has downloaded an application allowing it to bidirectionally exchange information with the wheel units that are each associated with a respective wheel of a motor vehicle.

The wheel unit 3 has stored a list of commands to be activated on request. A remote monitoring and/or control device 2 has also stored the same list. A device is said to be authorized when it is recognized as authorized to be able to converse with the wheel unit 3, in other words its identifier appears in the list of the wheel unit listing the identifiers of known devices authorized to converse with the wheel unit in question.

These commands may comprise a command relating to a period of sending of signaling messages by the wheel unit 3 that becomes shorter when an authorized device 2 is detected in proximity to the wheel unit 3 and vice versa when the authorized device 2 moves away from the motor vehicle.

This makes it possible to moderate the energy expenditure in the wheel unit 3 while ensuring its operation, this wheel unit 3 incorporating a battery of button cell type with necessarily limited capacity.

Another command may be an estimate of a footprint of the wheel associated with the wheel unit 3 so as to determine a quotient of the footprint of the wheel on the ground on the basis of a periodic acceleration curve plotted as a function of the time, the quotient being the ratio of a duration of a decrease in acceleration to a period of the acceleration curve.

Other commands may relate to a detection of a particular phenomenon such as aquaplaning, an execution of a particular sequence of transmissions or an adjustment of a basic sequence of transmissions such as measurements of one or more specific parameters of the wheel that is associated with the wheel unit 3 such as a pressure of the tire of the associated wheel, measurements of one or more specific parameters of the wheel that is associated with the wheel unit 3 such as a pressure or a temperature of the tire of the associated wheel, a speed of rotation of the wheel and/or a location of the wheel unit 3 on the motor vehicle.

As is becoming increasingly widespread for communications involving one or more wheel units, a communication between the monitoring device 2 and the wheel unit 3 takes place according to a communication protocol allowing a bidirectional short-range data exchange using ultra-high-frequency, or UHF, radio waves, advantageously according to a communication protocol of Bluetooth® type, for example.

For this purpose, the wheel unit 3 comprises a UHF module provided with a UHF transmitter and a UHF receiver, a microprocessor and storage means. The bidirectional exchanges may concern multiple UHF channels differing in UHF frequency.

The most frequently used UHF communication may provide three channels, but there could be more. It has been possible to have up to 25 UHF channels for a single UHF module fitted to a wheel unit 3.

The wheel unit 3 periodically sends basic signaling messages 1 indicating its presence to any ultra-high-frequency wave communication device located in an environment of the wheel unit 3. This is a conventional Bluetooth® protocol communication mode and it does not make it possible to differentiate between the receiving communication devices that are authorized to receive information and those that are not.

The basic signaling messages are simple, do not contain data, might not be addressed, except in special cases, to a specific UHF communication device, and only serve to signal the presence of the wheel unit 3 to the device.

There may be two types of basic signaling message. The first type groups together classic basic signaling messages that only indicate the presence of the wheel unit. The second type groups together basic signaling messages that additionally indicate a menu proposal of possible commands.

By combining these two types of signaling message, there may be a first variant of sending, by the wheel unit, three successive messages of the first type followed by one message of the second type. If an authorized device wants to effect a command, it must wait for a message of the second, menu proposal type to reach it.

There may be a second variant which, after receiving, by the wheel unit, a standard basic response from the authorized device, provides for the wheel unit to send a message of the second type.

The operation is then performed in two stages: the authorized device first triggers the command enumeration proposal and then responds favorably thereto by sending a standard response message. A UHF communication device is capable of intercepting a basic signaling message 1 and sending a standard response message 1a to the wheel unit 3.

This occurs for a device communicatively associated with the wheel unit 3 as a monitoring and/or control device 2 but may be the case for a UHF communication device that has no relationship with the wheel unit 3.

It is therefore necessary to prevent this UHF communication device from being recognized as a device working with the wheel unit 3, such a device being referred to as an authorized device 2 in being a device 2 for remote monitoring and/or control via UHF communication recognized as being able to dialog with the wheel unit 3.

To do this, the wheel unit 3 has previously stored a group of communication devices that are authorized to serve as remote monitoring and/or control devices therefore. As with all devices paired for UHF communications, it is possible to add or remove a communication device to or from the group.

The wheel unit 3 checks whether the communication device that has sent a response message belongs to the group, which is done in questioning step 5. If it does, which is denoted Y (yes) with respect to the standard response message, the wheel unit 3 sends the authorized device 2 a series of signaling messages relating to the commands. Otherwise, it returns to the input of questioning step 5, which is not illustrated in FIGS. 2 and 3.

Each signaling message of the series M2c1, M2c2, M2cN; Mc1, Mc2, McN is associated with a single command and the series performing the enumeration of all of the commands of the list taken with one command per message for all of the signaling messages of the series M2c1, M2c2, M2cN; Mc1, Mc2, McN.

When the authorized device 2 receives a message relating to a specific command that the authorized device 2 requests to have activated by the wheel unit 3, the authorized device 2 sends back to the wheel unit 3 a standard response message without data specific to the command being interpreted by the wheel unit, taking account of the signaling message that the wheel unit had previously sent, as an order to activate dA cN the specific command and the wheel unit 3 then activates A cN the specific command thus selected.

A signaling message of the series M2c1, M2c2, M2cN; Mc1, Mc2, McN relating to a specific command may be repeated for a predetermined duration for as long as no response from the authorized device 2 is received by the wheel unit 3. This is shown by questioning steps 61, 62. There may be multiple messages relating to one and the same command that are sent successively and not just one as shown in FIGS. 2 and 3.

When the predetermined duration is exceeded, which is illustrated by the output Y from questioning step 61, 62, the sending of the messages specific to this command is suspended. A signaling message of the series M2c1, M2c2, M2cN; Mc1, Mc2, McN relating to another command is then sent and is repeated, if necessary, this being performed successively for all of the commands of the list.

Alternatively, a whole series of different commands may be sent all together. In this case, a signaling message specific to just one command may be followed by a specific signaling message for each of the other commands of the series, therefore without consecutively repeating signaling messages relating to one and the same command.

When the authorized device 2 sends back to the wheel unit 3 a standard response message interpreted by the wheel unit as an activation order message dA cN for a command, the sending of signaling messages for the other commands is suspended. The process of sending signaling messages that are associated with other commands no longer applies because the command the activation of which is desired has been recognized by the authorized device 2. This may however be different when there is the possibility of selecting multiple commands simultaneously.

When the signaling messages relating to the commands M2c1, M2c2, M2cN; Mc1, Mc2, McN have been sent to the authorized device 2 without response therefrom for the entire series of commands, the wheel unit 3 sends a signaling message to the authorized device 2 to find out whether or not its request to send an enumeration of the commands contained in the command list is still valid.

This was done previously by sending the basic signaling message 1, used to implicitly ask whether an enumeration of a list of commands was desired by the authorized device to which the authorized device 2 responded with the standard response message la which is a message equivalent to an acknowledgement of receipt without containing other data relating to the enumeration of the commands.

If the authorized device 2 responds with a standard response message la to the signaling message 1, the wheel unit interprets this standard response message la as a request to enumerate the commands contained in the list, a new series of command-related signaling messages M2c1, M2c2, M2cN; Mc1, Mc2, McN is sent by the wheel unit 3 to the authorized device 2.

A number may be assigned to each command in the list of commands and in each authorized device 2, the signaling messages of the series M2c1, M2c2, M2cN; Mc1, Mc2, McN each taking the respective number of the associated command with an identifier linked to the wheel unit 3 or an identifier linked to the authorized device 2.

In FIGS. 2 and 3, the identifier of the wheel unit is given as its reference 3, which is the common reference for the wheel units 3a to 3d in FIG. 1, and the identifier of the authorized device is given as its reference 2 in FIG. 2, but it is understood that a basic identifier is more complex than just one digit.

The wheel unit 3 and the authorized device 2 therefore have, respectively, a basic identifier used for communication other than command-related signaling messages that these two entities know beforehand at the start of the communication.

In the two optional embodiments illustrated in FIGS. 2 and 3, respectively, a first of the basic identifiers of the wheel unit 3 or of the authorized device 2, in FIG. 2 the identifier of the authorized device 2 and in FIG. 3 the identifier of the wheel unit 3, is temporarily modified for the signaling messages relating to the commands M2c1, M2c2, M2cN; Mc1, Mc2, McN.

The wheel unit 3 and the authorized device may take back their basic identifier before or after sending the standard response message interpreted by the wheel unit as an activation order message dA cN for the specific command.

In FIG. 2, the authorized device 2 takes back its basic identifier 2 after having sent the standard response message interpreted by the wheel unit as an activation order message dA cN for the specific command and in FIG. 3, the wheel unit 3 takes back its basic identifier 3 after having received the standard response message interpreted by the wheel unit as an activation order message dA cN for the specific command.

Throughout the sending of the command-related messages, the second of the basic identifiers of the wheel unit 3 or of the authorized device 2 remains unchanged, in FIG. 2 the identifier of the wheel unit 3 and in FIG. 3 the identifier of the authorized device 2.

The wheel unit 3 or the authorized device 2 with the unchanged second identifier then takes into account from a start of sending of the command-related signaling messages M2c1, M2c2, M2cN; Mc1, Mc2, McN that the first identifier, that of the authorized device 2 in FIG. 2 and that of the wheel unit 3 in FIG. 3, has been temporarily modified.

As can be seen in FIG. 2, which shows a first optional mode of communication between the wheel unit 3 and the authorized device 2 for determining the command to be activated, when the modified first identifier is that of the authorized device 2, the basic identifier of the authorized device 2 is temporarily modified to include the number of the command that the authorized device 2 requests to have activated by giving the modified identifier 2cN. At the same time, the basic identifier of the wheel unit 3 is retained.

The wheel unit 3 sends signaling messages relating to the commands M2c1, M2c2, M2cN for authorized devices that are identified, respectively, by the basic identifier of the authorized device 2 including a respective command number.

For example, if the identifier of the authorized device 2 is changed to 2cN to activate the command N, signaling messages M2c1 and M2c2 are sent to virtual authorized devices, which are not referenced in FIG. 2 but which may have, by analogy with the modified identifier 2cN of the authorized device 2 for a command x, an identifier 2cx of an authorized device that does not exist.

In FIG. 2, the signaling messages M2c1 and M2c2 are sent, respectively, for the first and second commands and designate the commands other than the command to be activated, which is the command N.

The authorized device 2 with the modified identifier 2cN temporarily including the number of the command N that the authorized device 2 requests to have activated is the only one of said authorized devices to be able to respond to the signaling message containing the command number N to be activated, the other authorized devices with modified identifiers being virtual in that they do not exist or at least if by chance they do exist, it is unlikely that they are actually within communication range, let alone authorized for the wheel unit in question.

To reinforce robustness, the command enumeration and selection sequence may optionally end with a new auxiliary checking phase, via the confirmation key agreed between the wheel unit 3 and the authorized device, according to the process preceding the enumeration of the commands as described above.

As can be seen in FIG. 3, which shows a second optional mode of communication between the wheel unit 3 and the authorized device 2 for determining the command to be activated, when the modified first identifier is that of the wheel unit 3, the basic identifier of the wheel unit 3 is temporarily duplicated into as many modified identifiers 3c1, 3c2, 3cN as there are commands in the list.

Each temporarily modified identifier 3c1, 3c2, 3cN of the wheel unit 3 comprises, in addition to the identifier of the wheel unit 3, a number of a respective command of the list, for example c1, c2 and cN for the first, second and nth commands. The basic identifier of the authorized device 2 is then kept as 2 in FIG. 3.

The authorized device 2 responds, with a standard response message, to the signaling message from the wheel unit 3 under the modified identifier 3c1, 3c2, 3cN comprising the number of the command that the authorized device 2 requests to have activated, in FIG. 3, the command N with the standard response message interpreted by the wheel unit as an activation request in response dA cN including the number of the command to be activated. The command N is then activated in the wheel unit 3, which is denoted A cN.

A third optional mode of communication between the wheel unit and the authorized device for determining the command to be activated, which is not shown in the figures, may be implemented when the bidirectional short-range data exchange using ultra-high-frequency radio waves is performed with a number of respective frequency channels at least equal to the number of commands to be activated.

In this configuration, each signaling message sent by the wheel unit and relating to a respective command passes through a specific channel. A channel number is assigned to each channel corresponding to the number of the command associated with the signaling message passing through this channel.

The numbering of the channels according to the commands is also known to the authorized device. In this third optional mode, the authorized device responds, with a standard response message, only to the signal message that has passed through the channel bearing the same number as the command that the authorized device requests to have activated by the wheel unit.

In addition to checking that a communication device belongs to the group of receiving devices that are authorized to serve as remote monitoring and/or control devices for the wheel unit in the capacity of authorized devices, one or more of the following auxiliary checks may be carried out, taken individually or in combination.

The first auxiliary check, illustrated in FIGS. 2 and 3, consists of the check signaling message 4 sent from the wheel unit 3 to the communication device 2, the authorization of which is to be checked, and the response message 4a that the communication device 2 sends back to the wheel unit 3 thus confirming its authorization.

The check signaling message 4 comprises the identifier 2 of the communication device modified with the addition of a confirmation key cl known to the wheel unit 3 and to any authorized device 2 by giving the modified identifier 2c1.

The authorized device 2 is preprogrammed to temporarily modify its identifier by adding the confirmation key thereto, i.e. by transforming its identifier 2 into 2c1 as shown in FIGS. 2 and 3.

When the communication device has actually received the check signaling message 4 with the confirmation key, it is confirmed that the communication device is indeed an authorized device wishing to trigger the enumeration of the commands 2 that has preprogrammed a temporary modification of its identifier with a confirmation key, otherwise it could not have received the check signaling message 4 with the confirmation key.

The communication device 2 then informs the wheel unit 3 by sending its standard check response message 4a and takes back its usual starting identifier 2.

Figure 4:
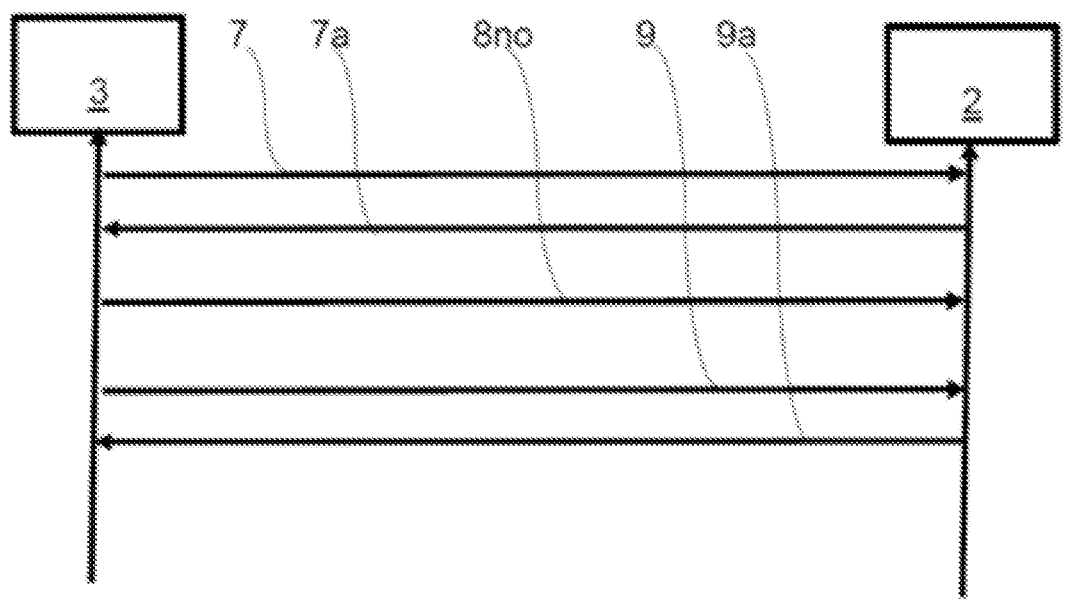

The second auxiliary check, shown in FIG. 4 with a communication device which will be checked to be authorized, consists in sending, by the wheel unit 3, exclusively to a UHF communication device 2, three successive signaling messages 7, 8no, 9 using an identifier communicated by the communication device 2 in its response message to the wheel unit 3, therefore signaling messages 7, 8no, 9 meant only for it.

The first message 7 incorporates a response request, the second message incorporates a response interdiction request and the third message 9 incorporates a response request. When the communication device 2 responds with standard response messages 7a, 9a to the first and third messages 7, 9 without responding to the second 8, it is confirmed that the communication device is indeed an authorized device wishing to trigger the enumeration of the commands 2.

The third auxiliary check, not shown in the figures, provides for sending, by the wheel unit exclusively to an authorized device, at least two signaling messages using an identifier previously assigned to the communication device.

The first signaling message is transmitted via a first, default frequency channel and said at least second signaling message is transmitted via a second channel, the frequency of which is different from the frequency of the first channel. There may however be more than two signaling messages, all sent via different channels.

An authorized device is programmed to perform, on receiving the first signaling message, a permutation of reception from the first channel to the second channel, and, where applicable, so on for n channels and n signaling messages.

Thus, when the communication device has performed such a permutation and responded to said at least two signaling messages with a standard response message, it is confirmed that the communication device is indeed an authorized device wishing to trigger the enumeration of the commands and authorized to control the wheel unit in question.

The control method may be applied to one, some or all of the wheel units, since for some of the commands, a comparison may be made between parameters of the wheel units.

In the case of a request for a command to be activated by wheel units, where the command remains the same for all of the wheel units, in order to prevent the method from being repeated for each of the units, which requires an expenditure of energy in each wheel unit, there may be selected, at least temporarily, one wheel unit from among the wheel units to be a concentrator wheel unit carrying out communication between the wheel units and at least one remote monitoring and/or control device for the activation of at least one command in at least one of the wheel units.

In this case, the concentrator wheel unit sends at least one signaling frame to at least one of the other wheel units when activation of a command is requested in said at least one of the other wheel units with mention of the requested command to be activated.

It is possible for a wheel unit that assumes the role of concentrator wheel unit to play the temporary role of an authorized device with respect to the other wheel units of the system. In this variant, the concentrator wheel unit would not be limited to sending one signaling message but could intercept, one by one, the signaling messages from the other wheel units, substantially performing the role of a central electronic control unit on board the motor vehicle.

The method described above may be produced either in the application portion of software, or directly handled by the basic functionalities of an electronic chip, integrated, for example, into a wheel unit, and being able to be stored in ROM/flash-type memory.

This also applies to the ultra-high-frequency communication device and the central electronic unit on board the motor vehicle that communicates with the wheel units.

An aspect of the present invention therefore also relates to a wheel unit comprising an application-specific integrated circuit with a microprocessor for controlling the unit, provided with a microprocessor and storage means, the integrated circuit of the wheel unit implementing a method as described above.

The wheel unit also comprises a module for ultra-high-frequency communication according to a communication protocol, for example of Bluetooth® type, with an antenna for communicating, both in reception and in transmission, with communication devices according to a protocol, for example of Bluetooth® type, and electronic components that are integrated at least partially, or otherwise, into the integrated circuit. For example, the communication module may comprise a microprocessor, a crystal-controlled clock and storage means.

The invention claimed is:

1. A method for controlling, by a remote monitoring and/or control device, an activation of a command in a wheel unit associated with a wheel of a motor vehicle, the method comprising:
   storing in the wheel unit a group of communication devices that are authorized to serve as remote monitoring and/or control devices;
   storing in the wheel unit a list of commands to be activated on request;
   storing in said monitoring device a same list of commands as stored in the wheel unit;
   communicating between said monitoring device and the wheel unit with a communication protocol that allows a bidirectional short-range data exchange using ultra-high-frequency radio waves;
   periodically sending, by the wheel unit, basic signaling messages indicating a presence of the wheel unit to any ultra-high-frequency wave communication device located in an environment of the wheel unit, the communication device being capable of intercepting the basic signaling message and of sending a standard response message to the wheel unit;
   checking, by the wheel unit, whether the communication device that sent the standard response message belongs to the group of communication devices stored in the wheel unit, and, if the communication device belongs to the group:
      sending by the wheel unit to an authorized device a series of command-related signaling messages, each signaling message of the series being associated with a single command of the list of commands and the series performing an enumeration of all of the commands of the list of commands taken with one command per message for all of the signaling messages of the series, and,
      when the authorized device receives a message relating to a specific command that the authorized device requests to have activated by the wheel unit, sending, by the authorized device to the wheel unit, the standard response message; and
      activating, by the wheel unit, the specific command.

2. The control method as claimed in claim 1, further comprising:
   repeating a signaling message of the series relating to a specific command for a predetermined duration for as long as no response from the authorized device is received by the wheel unit;
   suspending the sending of the messages specific to this command at an end of a predetermined duration and a signaling message of the series relating to another command is sent and is repeated successively for all of the commands of the list; or
   sending a signaling message specific to a single command followed by a specific signaling message for each of the other commands of the series.

3. The control method as claimed in claim 2, wherein, when the authorized device sends back to the wheel the standard response message received by the wheel unit and interpreted as an activation order for a command, the sending of signaling messages for the other commands is suspended and, when the signaling messages have been sent to the authorized device without response therefrom for the entire series of commands, the wheel unit sends a signaling message to the authorized device and if the authorized device responds and confirms by sending a standard response message interpreted by the wheel unit as a request to enumerate the commands contained in the list, a new series of signaling messages relating to the commands is sent by the wheel unit to the authorized device.

4. The control method as claimed in claim 2, wherein a number is assigned to each command in the list of commands and in each the authorized device of the group of communication devices, the signaling messages of the series each taking the respective number of the associated command with an identifier linked to the wheel unit or an identifier linked to the authorized device.

5. The control method as claimed in claim 4, wherein the wheel unit and the authorized device respectively comprising a basic identifier used for communication other than command-related signaling messages, a first of the basic identifiers of the wheel unit or of the authorized device is temporarily modified for the command-related signaling messages, the a second of the basic identifiers of the wheel unit or of the authorized device remaining unchanged, the wheel unit or the authorized device with the unchanged second identifier taking into account from a start of sending of the command-related signaling messages that the first identifier has been temporarily modified.

6. The control method as claimed in claim 5, wherein:
when the first modified identifier is that of the wheel unit, the basic identifier of the wheel unit is temporarily duplicated into as many modified identifiers as there are commands in the list, each temporarily modified identifier of the wheel unit comprising a number of a respective command of the list, the basic identifier of the authorized device being retained, the authorized device responding to the signaling message from the wheel unit under the modified identifier comprising the number of the command that the authorized device requests to have activated, or
when the first modified identifier is that of the authorized device, the basic identifier of the authorized device is temporarily modified to include the number of the command that the authorized device requests to have activated, the basic identifier of the wheel unit being retained, the wheel unit sending signaling messages relating to the commands for authorized devices identified, respectively, by the basic identifier of the authorized device including a respective command number, the authorized device with the modified identifier temporarily including the number of the command that the authorized device requests to have activated being the only one of said authorized devices to be able to respond to the signaling message containing the command number to be activated, the other authorized devices with modified identifiers being virtual.

7. The control method as claimed in claim 1, wherein, when the bidirectional short-range data exchange using ultra-high-frequency radio waves is performed with a number of respective frequency channels at least equal to the number of commands to be activated, each signaling message sent by the wheel unit and relating to a respective command passes through a specific channel, a channel number being assigned to each channel corresponding to the number of the command associated with the signaling message passing through this channel, the numbering of the channels according to the commands stored in the authorized device, the authorized device responding only to the signal message that sent via the channel having the same number as the command that the authorized device requests to have activated by the wheel unit.

8. The control method as claimed in claim 1, wherein, in addition to checking that a communication device belongs to the group of receiving devices that are authorized to serve as remote monitoring and/or control devices for the wheel unit in the capacity of devices authorized to control the wheel unit, one or more of the following checks are carried out, taken individually or in combination:
sending, by the wheel unit exclusively to a communication device, of a check signaling message using an identifier previously assigned to the communication device modified by adding a confirmation key known to the wheel unit and to any authorized device, an authorized device being programmed to temporarily modify its identifier by adding the confirmation key thereto, and, when the communication device receives the check signaling message with the confirmation key and responds with a check response message, it is confirmed that the communication device is indeed an authorized device wishing to trigger the enumeration of the commands,
sending, by the wheel unit exclusively to a communication device, of three successive signaling messages using an identifier communicated by the communication device in its response message to the wheel unit, the first message requesting a response, the second message containing a response interdiction and the third message requesting a response and, when the communication device responds to the first and third messages without responding to the second, it is confirmed that the communication device is indeed an authorized device wishing to trigger the enumeration of the commands,
sending, by the wheel unit exclusively to a communication device, of at least two signaling messages using an identifier previously assigned to the communication device, the first signaling message being transmitted via a first, default frequency channel and said at least second signaling message being transmitted via a second channel, the frequency of which is different from the frequency of the first channel, an authorized device being programmed to perform, on receiving the first signaling message, a permutation of reception from the first channel to the second channel, and, when the communication device that has performed the permutation and responded to said at least two signaling messages with a standard signaling response message, it is confirmed that the communication device is indeed an authorized device wishing to trigger the enumeration of the commands.

9. The control method as claimed in claim 1, wherein the commands are selected from among a command relating to a period of sending of signaling messages by the wheel unit that becomes shorter when an authorized device is detected in proximity to the wheel unit and vice versa when the authorized device moves away from the motor vehicle, an estimate of a footprint of the wheel associated with the wheel unit, a detection of a particular phenomenon selected from the group consisting of:
aquaplaning,
an execution of a particular sequence of transmissions or an adjustment of a basic sequence of transmissions including measurements of one or more specific parameters of the wheel that is associated with the wheel unit including a pressure of the tire of the associated wheel, a speed of rotation of the wheel, and a location of the wheel unit on the motor vehicle.

10. The control method as claimed in claim 1, wherein the method is performed on each of the wheel units that are associated with a wheel of the motor vehicle.

11. The control method as claimed in claim 10, wherein there is selected, at least temporarily, one wheel unit from among the wheel units to be a concentrator wheel unit carrying out communication between the wheel units and at least one remote monitoring and/or control device for the activation of at least one command in at least one of the wheel units, the concentrator wheel unit sending at least one signaling frame to at least one of the other wheel units when activation of a command is requested to be activated in said at least one of the other wheel units.

12. A wheel unit comprising:
an application-specific integrated circuit for controlling the unit, the application-specific integrated circuit being provided with a microprocessor and storage;
a module for ultra-high-frequency bidirectional communication,
wherein the application-specific integrated circuit implements a method comprising:
storing in the wheel unit a group of communication devices that are authorized to serve as remote monitoring and/or control devices;
storing in the wheel unit a list of commands to be activated on request;
storing in said monitoring device a same list of commands as stored in the wheel unit;
communicating between said monitoring device and the wheel unit with a communication protocol that allows a bidirectional short-range data exchange using ultra-high-frequency radio waves;
periodically sending, by the wheel unit, basic signaling messages indicating a presence of the wheel unit to any ultra-high-frequency wave communication device located in an environment of the wheel unit, the communication device being capable of intercepting the basic signaling message and of sending a standard response message to the wheel unit;
checking, by the wheel unit, whether the communication device that sent the standard response message belongs to the group of communication devices stored in the wheel unit, and, if the communication device belongs to the group:
sending by the wheel unit to an authorized device a series of command-related signaling messages, each signaling message of the series being associated with a single command of the list of commands and the series performing an enumeration of all of the commands of the list of commands taken with one command per message for all of the signaling messages of the series, and,
when the authorized device receives a message relating to a specific command that the authorized device requests to have activated by the wheel unit, sending, by the authorized device to the wheel unit, the standard response message; and
activating, by the wheel unit, the specific command.

13. The control method as claimed in claim 1, wherein the communication between the wheel unit and the monitoring device is a direct communication.

* * * * *